(12) United States Patent
Jabari et al.

(10) Patent No.: US 10,325,370 B1
(45) Date of Patent: Jun. 18, 2019

(54) METHOD AND SYSTEM OF COREGISTRATION OF REMOTE SENSING IMAGES

(71) Applicant: University of New Brunswick, Fredericton (CA)

(72) Inventors: Shabnam Jabari, Fredericton (CA); Yun Zhang, Fredericton (CA)

(73) Assignee: University of New Brunswick, Fredericton, NB (CA)

( * ) Notice: Subject to any disclaimer, the term of this patent is extended or adjusted under 35 U.S.C. 154(b) by 325 days.

(21) Appl. No.: 15/169,181

(22) Filed: May 31, 2016

(51) Int. Cl.
*G06K 9/00* (2006.01)
*G06T 7/00* (2017.01)

(52) U.S. Cl.
CPC ............ *G06T 7/003* (2013.01); *G06T 7/0032* (2013.01); *G06T 7/0079* (2013.01); *G06T 2207/10028* (2013.01); *G06T 2207/10036* (2013.01); *G06T 2207/20221* (2013.01)

(58) Field of Classification Search
CPC ..... G06T 7/003; G06T 7/0032; G06T 7/0079; G06T 2207/10028; G06T 2207/10036; G06T 2207/20221
See application file for complete search history.

(56) References Cited

U.S. PATENT DOCUMENTS

| | | | | |
|---|---|---|---|---|
| 5,550,937 | A * | 8/1996 | Bell | G06T 3/0081 382/278 |
| 2003/0014224 | A1* | 1/2003 | Guo | G06F 17/5004 703/1 |
| 2009/0322860 | A1 | 12/2009 | Zhang | |
| 2010/0207936 | A1* | 8/2010 | Minear | G06T 7/30 345/419 |
| 2011/0267344 | A1* | 11/2011 | Germann | G06K 9/00201 345/420 |
| 2013/0086585 | A1* | 4/2013 | Huang | H04L 67/14 718/1 |
| 2013/0335566 | A1* | 12/2013 | Coulter | H04N 7/181 348/144 |
| 2014/0064554 | A1* | 3/2014 | Coulter | G06K 9/3216 382/103 |

(Continued)

FOREIGN PATENT DOCUMENTS

WO    WO 2015/000060 A1    1/2015

OTHER PUBLICATIONS

Al-Khudhairy, Caravaggi and Glada, Structural damage assessments from IKONOS data using change detection, object-oriented segmentation, and classification techniques. Photogrammetric Engineering and Remote Sensing, 2005, 71(7): 825-837.

(Continued)

*Primary Examiner* — Amara Abdi
(74) *Attorney, Agent, or Firm* — Eugene F. Derényi; Fogler, Rubinoff LLP

(57) ABSTRACT

Certain embodiments of the present disclosure relate to a computer-implemented method and system which include patch-wise coregistration (PWCR) for change detection using remote sensing images which can be taken from satellites, aircraft, UAV and other platforms, where the images can be nadir or off-nadir images and can be acquired from the same or different view-angles. The remote sensing images can be bi-temporal or multi-temporal. VHF satellite images can be used.

23 Claims, 10 Drawing Sheets

(56) References Cited

U.S. PATENT DOCUMENTS

| | | | | |
|---|---|---|---|---|
| 2014/0321712 A1* | 10/2014 | Ciurea | ............. | H04N 13/232 |
| | | | | 382/106 |
| 2016/0098833 A1* | 4/2016 | Tsadok | ............. | G06K 9/6201 |
| | | | | 382/103 |
| 2016/0203608 A1* | 7/2016 | Izmirli | ............. | G06F 16/25 |
| | | | | 382/128 |

OTHER PUBLICATIONS

Armenakis, Jung, Sohn, Practices and trends in geospatial change determination, International Archives of the Photogrammetry, Remote Sensing and Spatial Information Sciences, 2010, 38(4), ISPRS Com IV Symposium, Orlando.

Blaschke, Object-based contextual image classification built on image segmentation. In Advances in Techniques for Analysis of Remotely Sensed Data, Oct. 2003 IEEE Workshop on, 113-119. IEEE.

Blaschke, Towards a framework for change detection based on image objects, 2005, Göttinger Geographische Abhandlungen, 113: 1-9.

Bouziani, Goita, Automatic change detection of buildings in urban environment from very high spatial resolution images using existing geodatabase and prior knowledge,2010, ISPRS Journal of Photogrammetry and Remote Sensing, 65: 143-153.

Chen, Hay, Carvalho and Wulder, Object-based change detection. International Journal of Remote Sensing, 2012, 33(14): 4434-4457.

Chen and Hutchinson, Urban damage estimation using statistical processing of satellite images. Journal of Computing in Civil Engineering, 2007, 21(3): 187-199.

Choi, Lee and Kim, A feature based approach to automatic change detection from LiDAR data in urban areas, 2009 ISPRS.

Crispell, Mundy and Taubin, A variable-resolution probabilistic three-dimensional model for change detection. Geoscience and Remote Sensing, 2012, IEEE Transactions on, 50(2): 489-500.

Dey, Vivek, Yun Zhang and Ming Zhong, A review on image segmentation techniques with remote sensing perspective. in Proceedings of the International Society for Photogrammetry and Remote Sensing Symposium, 2010, (ISPRS10), vol. XXXVIII (Part 7A).

Doxani, Karantzalos and Strati, Monitoring urban changes based on scale-space filtering and object-oriented classification. International Journal of Applied Earth Observation and Geoinformation, 2012, 15: 38-48.

Fawcett, An introduction to ROC analysis. Pattern recognition letters, 2006, 27(8), 861-874.

Fraser and Hanley, Bias-compensated RPCs for sensor orientation of high-resolution satellite imagery. Photogrammetric Engineering and Remote Sensing, 2005, 71(8): 909-915.

Greene, Kass and Miller, Hierarchical Z-buffer visibility. In Proceedings of the 20th annual conference on Computer graphics and interactive techniques, 1993, 231-238. ACM.

Grodecki, IKONOS stereo feature extraction-RPC approach, Annual Conference of the ASPRS,2001, 2001: 23-27.

Gueguen, Siolle and Pesaresi, Change detection based on information measure. Geoscience and Remote Sensing, 2011, IEEE Transactions on, 49(11): 4503-4515.

Jensen and Tullis, Object-based change detection using correlation image analysis and image segmentation. International Journal of Remote Sensing, 2008, 29(2): 399-423.

Rhee, Jensen and Hodgson, An automated binary change detection model using a calibration approach. Remote Sensing of Environment, 2007, 106(1): 89-105.

Jensen, A change detection model based on neighborhood correlation image analysis and decision tree classification. Remote Sensing of Environment, 2005, 99(3): 326-340.

Jung, Detecting building changes from multitemporal aerial stereopairs. ISPRS Journal of Photogrammetry and Remote Sensing, 2005, 58(3): 187-201.

Kang, Zhang, Yue and Lindenbergh, Range Image Techniques for Fast Detection and Quantification of Changes in Repeatedly Scanned Buildings. Photogrammetric Engineering & Remote Sensing, 2013, 79(8): 695-707.

Liu, Gong, Shi, Chen, Zhu and Sasagawa, Automated building change detection using UltraCam images and existing CAD data. International Journal of Remote Sensing, 2010, 31(6): 1505-1517.

Nielsen, Conradsen, and Simpson, Multivariate alteration detection (MAD) and MAF postprocessing in multispectral, bitemporal image data: New approaches to change detection studies. Remote Sensing of Environment, 1998, 64(1): 1-19.

Niemeyer, Marpu and Nussbaum, Change detection using object features. Object-Based Image Analysis. Springer, 2008, 185-201.

Pollard, Eden, Mundy and Cooper, A volumetric approach to change detection in satellite images. Photogrammetric Engineering & Remote Sensing, 2010, 76(7): 817-831.

Qin, Rongjun, Change detection on LOD 2 building models with very high resolution spaceborne stereo imagery. ISPRS Journal of Photogrammetry and Remote Sensing, 2014, 96: 179-192.

Riano, Chuvieco, Salas and Aguado, Assessment of different topographic corrections in Landsat-TM data for mapping vegetation types. Geoscience and Remote Sensing, IEEE Transactions on, 2003, 41(5), 1056-1061.

Sohl, Change analysis in the United Arab Emirates: An investigation of techniques, Photogrammetric Engineering &Remote Sensing, 1999, 65(4):475-484.

Sundaresan, Varshney and Arora, Robustness of change detection algorithms in the presence of registration errors. Photogrammetric Engineering & Remote Sensing, 2007, 73(4): 375-383.

Tian, Cui and Reinartz, Building change detection based on satellite stereo imagery and digital surface models. Geoscience and Remote Sensing, IEEE Transactions on, 2014, 52(1): 406-417.

Tong, Maxwell, Zhang, and Dey, A Supervised and Fuzzy-based Approach to Determine Optimal Multi-resolution Image Segmentation Parameters,2012, PE&RS, 78(10): 1029-1044.

Ye and Chen, An Unsupervised Urban Change Detection Procedure by Using Luminance and Saturation for Multispectral Remotely Sensed Images, Photogrammetric Engineering & Remote Sensing, 2015, 81 (8), 375-383.

Zhang, Understanding image fusion. Photogrammetric Engineering and Remote Sensing, 2004, 70(6): 657-661.

Zhou, Troy, and Grove, Object-based land cover classification and change analysis in the Baltimore metropolitan area using multi-temporal high resolution remote sensing data. Sensors, 2008, 8(3): 1613-1636.

Fraser and Hanley, Bias compensation in rational functions for IKONOS satellite imagery. Photogrammetric Engineering & Remote Sensing, 2003,69(1), 53-57.

J. Im, J.R. Jensen and J.A. Tullis, Object-based change detection using correlation image analysis and image segmentation. International Journal of Remote Sensing, vol. 29, No. 2, Jan. 20, 2008, 399-423.

\* cited by examiner

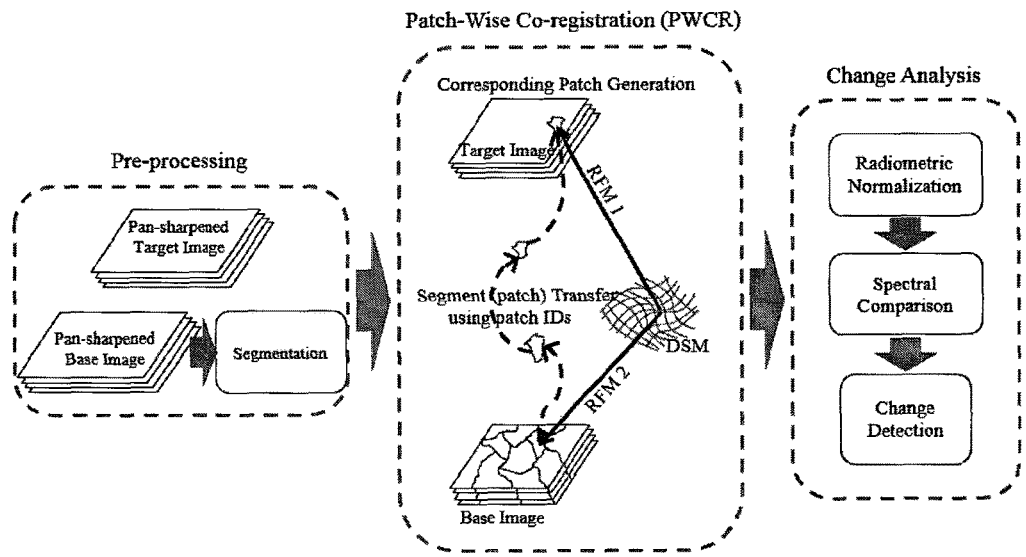
Figure 1
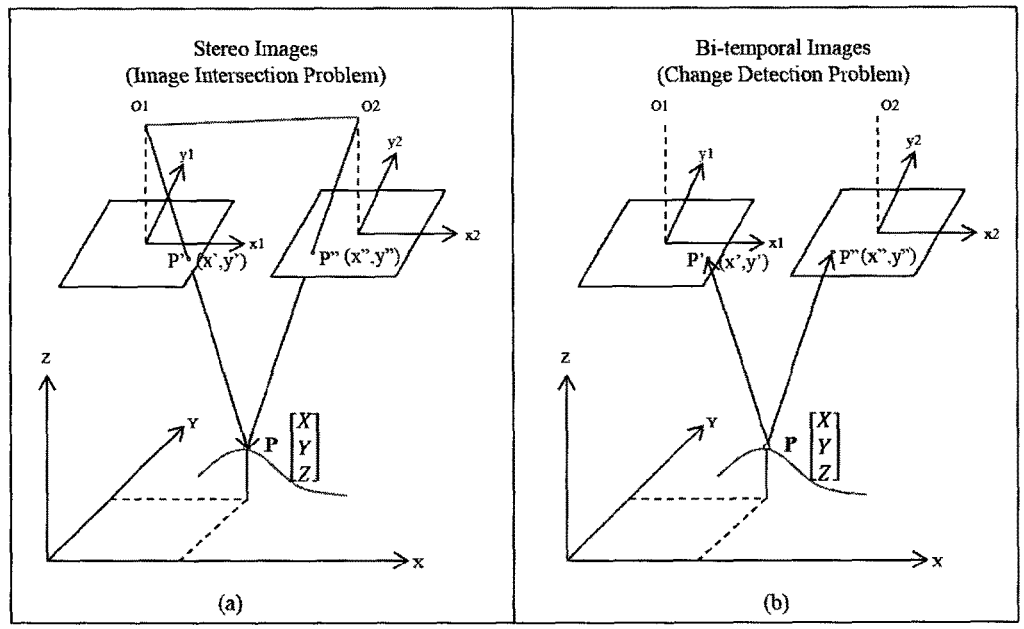
Figures 2(a) and (b)

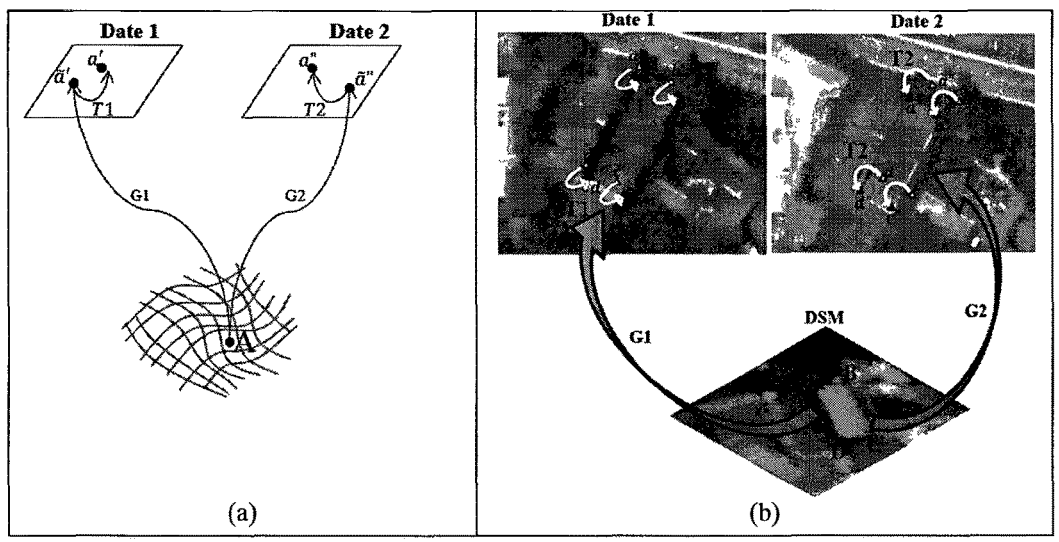
Figures 3(a) and (b)
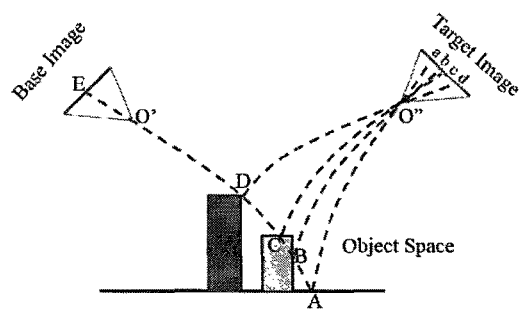
Figure 4

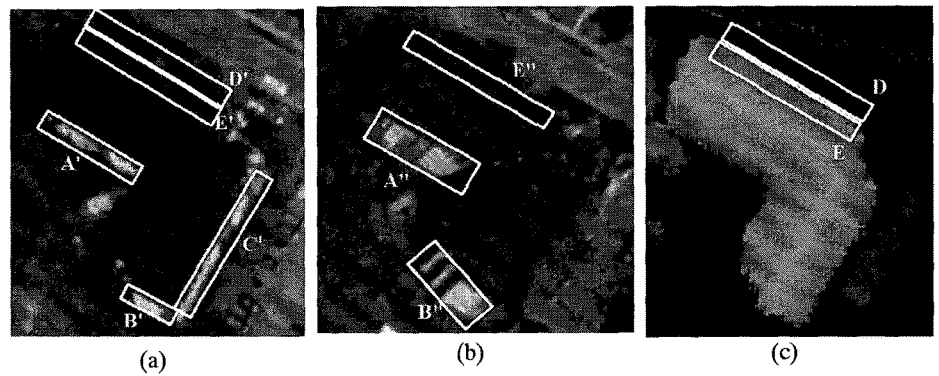
Figures 5(a)-(c)
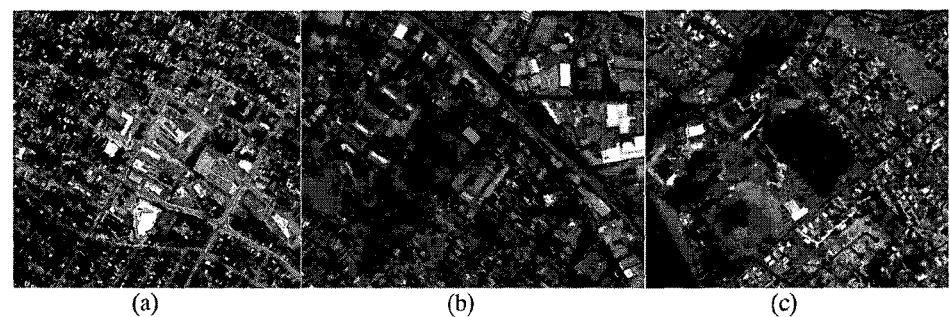
Figures 6(a)-(c)

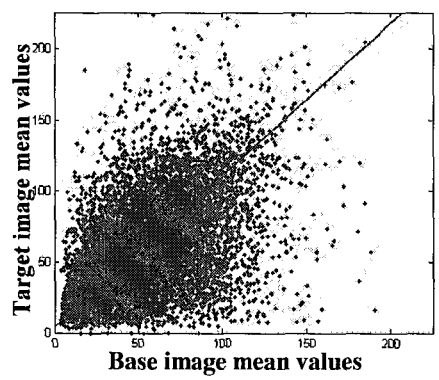 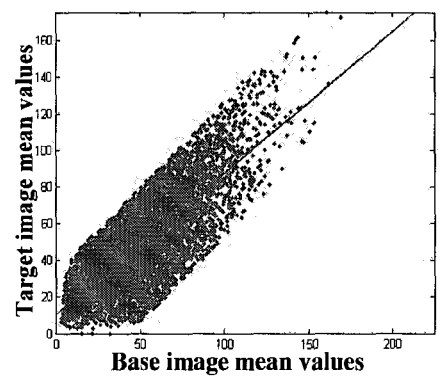
(a)          (b)
Figures 7(a) and (b)

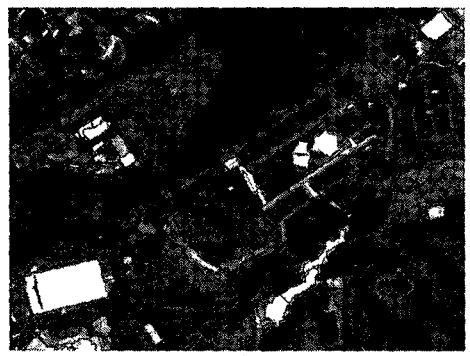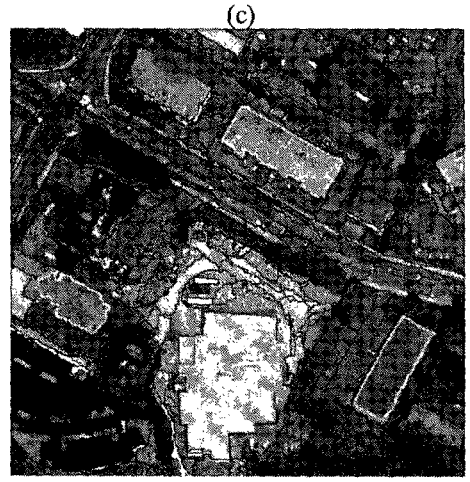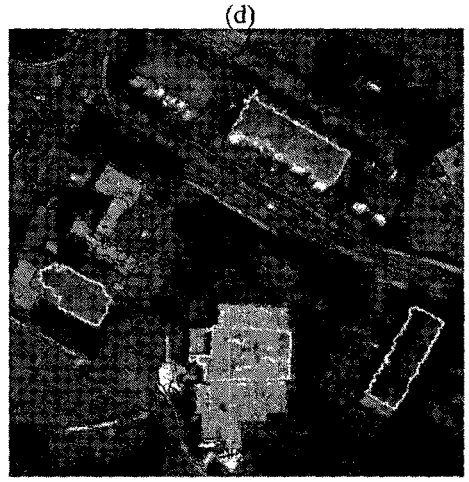
Figures 8(a)-(f)

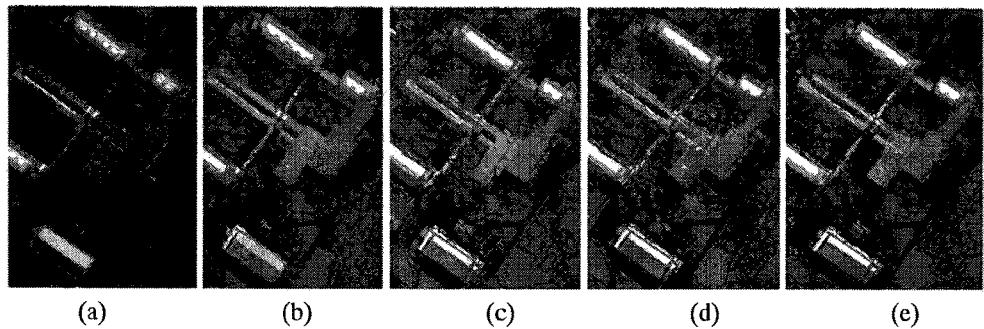
Figures 9(a)-(e)
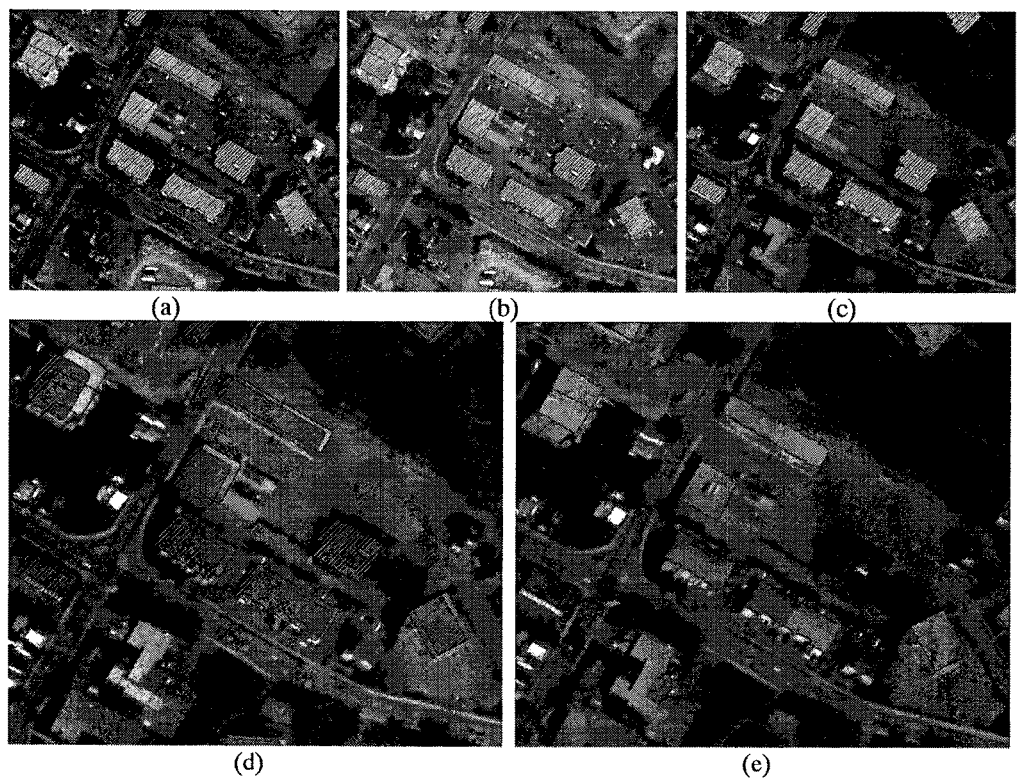
Figures 10(a)-(e)

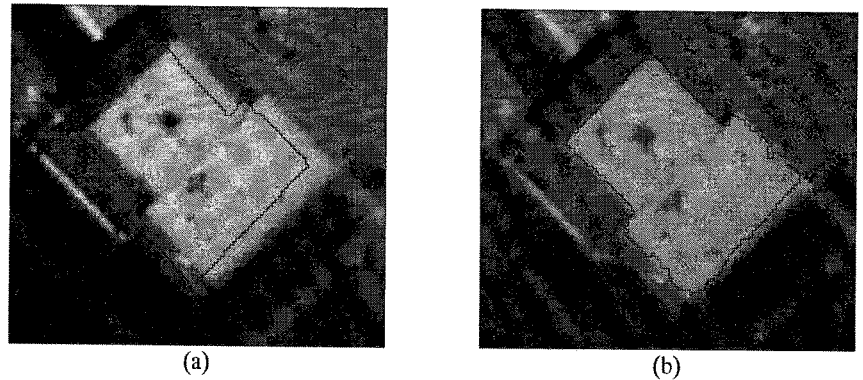
Figures 11(a) and (b)
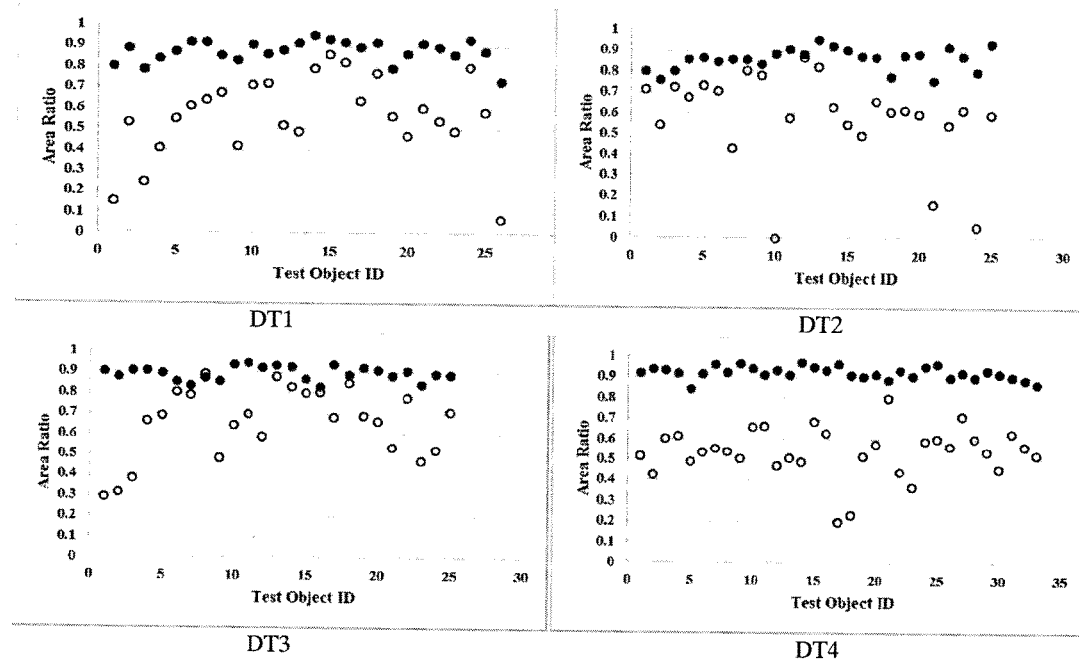
● PWCR Results
○ Conventional Results
Figure 12

METHOD AND SYSTEM OF COREGISTRATION OF REMOTE SENSING IMAGES

TECHNICAL FIELD

The present invention relates to coregistration of remote sensing images, and more particularly, to coregistration of remote sensing images for change detection.

BACKGROUND

Change detection matters to a large number of organizations, such as municipalities and local governments, for a wide range of applications including map updating and hazard assessment. VHR satellite images have been increasingly used for urban change detection because they can provide adequate details of urban environment (Armenakis et al. 2010). Other remote sensing images, such as from aircraft and UAVs can also be used. Changes in urban areas for example can be detected by comparing corresponding pixels/objects in bi/multi-temporal remote sensing images, if the spatial relation between the corresponding pixels/objects is known. Hence, change detection is normally conducted in the following three steps:
1) establishing a spatial relation between bi-temporal images (coregistration),
2) specifying the element of change detection: object (through segmentation) or pixel,
3) indicating the change: analyzing the spectral or spatial features of the objects or pixels to find changes.

Among these steps, the role of coregistration is crucial, since any error in coregistration, i.e. misregistration, directly affects the accuracy of change detection. Misregistration may cause two types of errors in change detection: either error of omission, in which the changed object is classified as unchanged; or error of commission, in which the unchanged object is classified as changed (Sundaresan et al. 2007). In both cases, the change detection accuracy is decreased.

The coregistration task is even more serious in urban VHR imagery acquired with high off-nadir viewing angles due to severe relief displacements. Because of this effect, the tops of the elevated objects, e.g. buildings in urban areas, lean far from their footprints, exposing parts of their side exterior, i.e. building façade, and blocking other lower objects such as roads. The latter effect is called occlusion. This leaning can occur in different directions depending on the image viewing angles, so that the coregistration of corresponding pixels/objects in bi-temporal or multi-temporal images becomes extremely difficult.

SUMMARY

Certain embodiments of the present disclosure relate to a computer-implemented method. The method includes patch-wise coregistration (PWCR) for change detection using remote sensing images which can be taken from satellites, aircraft, UAV and other platforms, where the images can be nadir or off-nadir images and can be acquired from the same or different view-angles. The remote sensing images can be bi-temporal or multi-temporal. VHF satellite images can be used.

Certain embodiments of the present disclosure relate to a computer-implemented method for coregistering remote sensing images taken from different viewing angles. The images can be off-nadir images or other sorts of remote sensing images. Due to varying local relief displacements of urban objects in the images, a patch-wise coregistration (PWCR) is used to coregister corresponding image patches at a local level. A patch can vary from a pixel to a large image segment that represents a part of or the whole ground object. In addition, the method includes finding corresponding patches in the two images and can include conducting change detection by comparing the corresponding patches for at least one difference such as difference in the spectral properties within the corresponding patches.

Certain embodiments of the present disclosure relate to a computer-implemented method for providing at least two remote sensing images, wherein one of the images is a base image and one of the images is a target image, the base image including one or more segments, providing elevation data for each segment and the sensor parameters of the images, projecting each of the segments from the base image onto the target image using the elevation data and sensor parameters, and registering the base image and the target image by registering each of the segments of the base image with the corresponding projected segments in the target image. The segments can be automatically generated using conventional image segmenting software such as is used in remote sensing. In certain embodiments, segmenting can be a pre-processing step or a part of the methods according to the present disclosure.

Certain embodiments of the present disclosure relate to a computer system configured to receive at least two remote sensing images, wherein one of the images is a base image and one of the images is a target image, the base image including one or more segments, receive elevation data for each segment and the sensor parameters of the images, project each of the segments from the base image onto the target image using the elevation data and sensor parameters, and coregister the base image and the target image by registering each of the segments of the base image with the corresponding projected segments in the target image.

Certain embodiments of the present disclosure relate to a system including one or more hardware processors and a memory. The memory stores instructions. When the instructions are executed by the one or more hardware processors, the one or more hardware processors perform a method. The method includes coregistering remote sensing images acquired by satellites, aircraft, UAV and other sensor platforms from different viewing angles. The images can be off-nadir images or other sorts of remote sensing images. The programmed method includes a patch-wise coregistration (PWCR) method to coregister corresponding image patches at a local level. A patch can vary from a pixel to a large image segment that represents a part of or the whole ground object. In addition, the programmed method includes finding corresponding patches in the two images and can further include conducting change detection by comparing the corresponding patches for at least one difference such a difference in the spectral properties within the corresponding patches.

Certain embodiments of the present disclosure relate to a non-transitory, computer-readable medium that stores instructions. When the instructions are executed by a processor, the processor performs a method. The method includes coregistering remote sensing images acquired by satellites, aircraft, UAV and other sensor platforms taken from different viewing angles. The images can be off-nadir images or other sorts of remote sensing images. The programmed method includes a patch-wise coregistration (PWCR) method to coregister corresponding image patches at a local level. A patch can vary from a pixel to a large image segment that represents a part of or the whole ground object. In addition, the programmed method includes finding corresponding patches in the two images and can further include conducting change detection by comparing the corresponding patches for at least one difference such a difference in the spectral properties within the corresponding patches.

Certain embodiments of the present disclosure relate to a system including a cloud computing environment comprising at least one server, the server being configured to communicate with a device remote from the server to receive instructions to receive at least two remote sensing images, wherein one of the images is a base image and one of the images is a target image, the base image comprising one or more segments, receive elevation data for each segment and the sensor parameters of the images, project each of the segments from the base image onto the target image using the elevation data and sensor parameters, and register the base image and the target image by registering each of the segments of the base image with the corresponding projected segments in the target image.

Certain embodiments of the present disclosure relate to a non-transitory, computer-readable medium that stores instructions, when the instructions are executed by a processor, the processor performs a method including providing at least two remote sensing images, wherein one of the images is a base image and one of the images is a target image, the base image comprising one or more segments, providing elevation data for each segment and the sensor parameters of the images, projecting each of the segments from the base image onto the target image using the elevation data and sensor parameters, and registering the base image and the target image by registering each of the segments of the base image with the corresponding projected segments in the target image.

It is to be understood that the foregoing general description and the following detailed description are exemplary and explanatory only, and are not restrictive of the invention, as claimed.

BRIEF DESCRIPTION OF THE DRAWINGS

The accompanying drawings, which constitute a part of this specification, illustrate several embodiments and, together with the description, serve to explain the disclosed principles. In the drawings:

FIG. 1 is a schematic diagram of the components of the presented framework for change detection;

FIGS. 2(a) and 2(b) are schematic diagrams depicting the comparison between the space intersection method and the proposed coregistration method. In FIG. 2(a), in space intersection the interior and exterior orientation parameters along with image coordinates of matching points (P' and P'') are used to calculate the ground coordinates (X,Y,Z) of ground point P. In FIG. 2(b), in general, the 3D coordinate of the ground point P(X,Y,Z) is used for coregistration, obtained from a DSM, along with the exterior orientation parameters, obtained from image RPCs, for finding the corresponding points in the bi-temporal images (P' and P'');

FIGS. 3(a) and 3(b) are schematic diagrams with remote sensing images depicting indirect matching of corresponding points using back-projection of DSM pixels into image spaces. FIG. 3(a) is a schematic representation of back-projection of a ground pixel, A, to the image spaces using RFM (G1 and G2 operators). Using the uncorrected RPCs, the ground point A is projected to ã' and ã'' in the bi-temporal images. Afterwards, by performing an affine transformation (T1 and T2), ã' and ã'' are transferred to their correct places a' and a'' respectively, resulting in the indirect matching of points a' and a''. In FIG. 3(b), a back-projection is shown with example remote sensing images. Some sample pixels (the corner pixels of a building) in the DSM are projected to the bi-temporal images using uncorrected RPCs. With T1 and T2 affine transformations in the image spaces, the associated image points are transferred to their correct positions;

FIG. 4 is a schematic representation of the occlusion effect in VHR imagery and occlusion removal by PWCR. Using RFM, the points A, C, and D are all projected to the point E on the base image. However, the intensity of the point E is only related to the point D, because D has a higher elevation and C and A are occluded (The line AE is shown as a curved line to reflect that the RFM equations are not linear). On the other hand, all the points A, B, C and D are visible in the target image (a,b,c,d). Therefore, A, B and C are removed from the change detection process;

FIGS. 5(a)-(c) show an example using remote sensing images of the occlusion effect in VHR imagery. The areas bordered by rectangle A' and B' belong to the building façade in FIG. 5(a). Due to higher off-nadir view angle in FIG. 5(b), more the building façade is visible in areas bordered by A'' and B''. These areas that belong to vertical surfaces are removed from the change detection process since they do not exist in a 2D DSTM. Area C' also belongs to a vertical object and is removed from the change detection process. Area D in FIG. 5(c) is occluded by the building roof in (b) and is removed from the change detection process by elevation comparison;

FIGS. 6(a)-(c) are snapshots of the study areas. FIG. 6(a) shows a combination of houses and elevated condos in Fredericton, Canada (dataset ID: DT4); FIG. 6(b) shows a combination of houses and industrial buildings in Hobart, Australia (dataset IDs: DT1 and DT2); and FIG. 6(c) shows a typical developed urban environment in Hobart, Australia (dataset ID: DT3);

FIGS. 7(a) and (b) are scatter plots of the mean values of the corresponding patches in the Red spectral band of Dataset DT3. FIG. 7(a) is before and FIG. 7(b) is after removing the changed patches. The regression line in FIG. 7(b) is a better representation of the relation between the mean values of the corresponding patches in the base and target images. Therefore, it is used for final radiometric normalization of the patches;

FIGS. 8(a)-(f) show PWCR results in the base images (FIGS. 8(a),(c) and (e)) and target images (FIGS. 8(b), (d) and (f)) (sub-sections). Using PWCR, corresponding patches are generated in the target images; FIGS. 8(a), (c) and (e) depict samples of patches in base images of DT3, DT1, and DT4. FIGS. 8(b), (d), and (f) show the corresponding patches that are generated in the related target images. Highlighted borders are to show how the borders generated by PWCR fit the actual object borders in the target images regardless of difference in the geometric distortions of images;

FIGS. 9(a)-(e) show a comparison of the object borders generated using the PWCR method and the conventional polynomial registration methods (dataset DT3); FIG. 9(a) shows borders of elevated objects in the base image generated manually, FIG. 9(b) shows segments transferred by a PWCR method, FIG. 9(c) shows 1st order polynomial registration (base and target images are registered using a 1st order polynomial), FIG. 9(d) shows 2nd order polynomial registration, FIG. 9(f) shows 3rd order polynomial registration;

FIGS. 10(a)-(e) shows accuracy comparison between the coregistration results from the PWCR method and the conventional method (using ortho-rectified images and polynomial coregistration). In FIG. 10(a), building roofs are shown manually delineated in an ortho-rectified base image; in FIG. 10(b), building roofs are shown manually generated in an original base image (without ortho-rectification); in FIG. 10(c), building roofs are shown manually generated in an original target image; in FIG. 10(d), overlay of building roof is shown generated using the conventional method (extracted from the ortho-rectified base image and transferred to ortho-rectified target image that is co-registered using polynomial co-registration) (shaded polygons) on actual building borders in the polynomial co-registered ortho-rectified target image generated manually (hollow polygons). The overlay of the two border layers is used to calculate the Area Ratio for the conventional coregistration method; in FIG. 10(e), borders of building roofs are shown extracted from the original base image FIG. 10(b) and transferred to the original target image using a PWCR method. The overlay of FIG. 10(e) and FIG. 10(c) is used to calculate the Area Ratio for a PWCR method. Since the overlap of the two layers (FIG. 10(c) and FIG. 10 (e)) were high, they are shown in separate images;

FIGS. 11(a) and (b) show a comparison between the coregistration result of the conventional method FIG. 10(a) and that of a PWCR method FIG. 10(b) (An enlarged view);

FIG. 12 shows a comparison of the Area Ratios generated using the PWCR method and the conventional method for datasets DT1 to DT4;

FIGS. 13(a) and (c) depict base image patches, while FIGS. 13(b) and (d) show the corresponding target image patches generated by PWCR along with labels discriminating the status of the objects (UC: unchanged; C: changed);

FIG. 14(a) DT1, FIG. 13(b) DT2, FIG. 13(c) DT3 and FIG. 13(d) DT4; and.

DESCRIPTION

Figure 13:
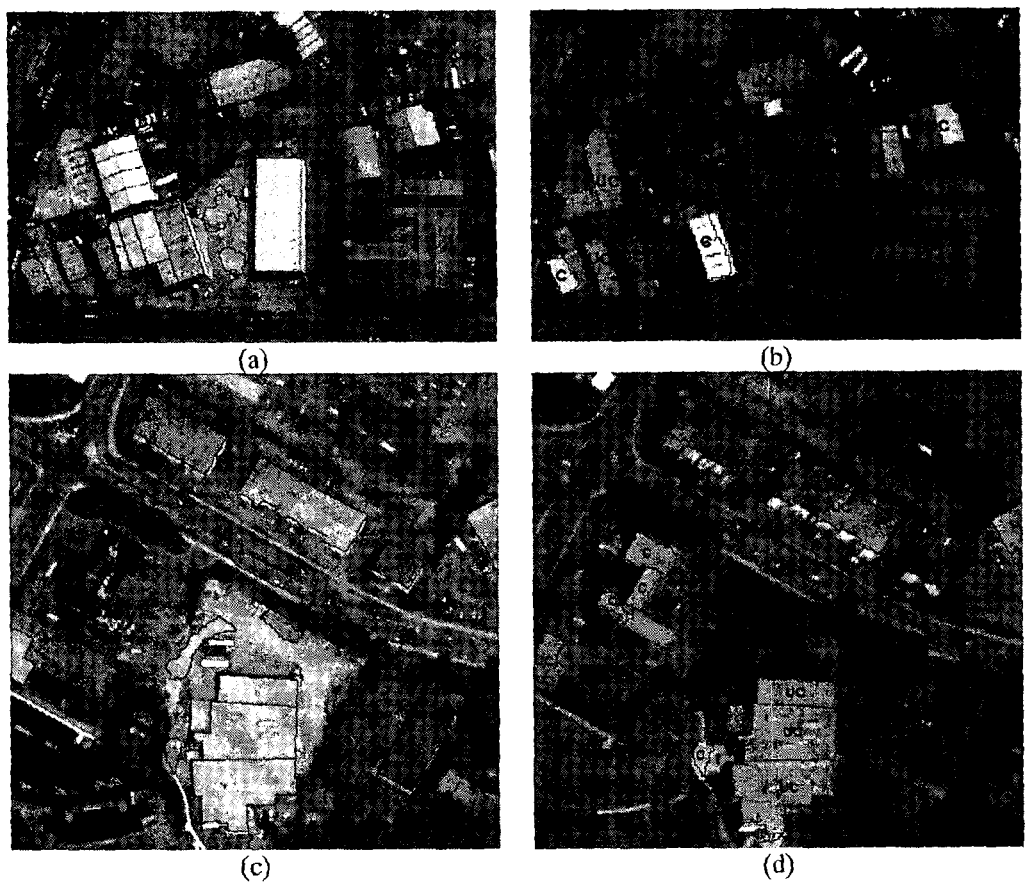
FIGS. 13(a)-(d) are samples of the reference patches selected for change detection accuracy assessment from datasets DT2 (FIGS. 13(a) and (b)) and DT4 (FIGS. 13(c) and (d)).

Various embodiments of the present disclosure will now be described with reference to the related drawings. Alternate embodiments may be devised without departing from the scope of this disclosure. Additionally, well-known elements of the disclosed embodiments will not be described in detail or will be omitted so as not to obscure the relevant details of the disclosure.

Generally, the present disclosure is directed to methods and systems for processing geospatial information. In one aspect, the present methods and systems help locate areas of change in a given geographic area by facilitating automatic change detection (at the region or item level), using remotely sensed imagery to detect changes associated with a geographic area. The remotely sensed imagery might be obtained by way of a satellite, aircraft, UAV and other platforms or other method.

An illustrative use of the present methods and systems might be, for example, to detect the presence of a new building that has recently appeared over some period of time. Perhaps this building was constructed over the course of a year in a geographic area such an urban area.

The disclosed embodiments include methods referred to herein as patch-wise co-registration (PWCR). PWCR may be used to overcome the misregistration problem caused by viewing angle difference and accordingly improve the accuracy of urban change detection. PWCR uses the elevation of the top part of an object (such as the roof of a building or the top of trees) in an image acquired by a satellite or airborne sensor. A digital surface model (DSM) or discrete 3D points (also referred to as a 3D point cloud) can be used. PWCR also uses the sensor parameters, such as Rational Polynomial Coefficients (RPCs) of bi-temporal or multi-temporal images to find corresponding points in the image set. The corresponding points are then used to generate corresponding patches in the image set. PWCR can be used to coregister objects in bi-temporal or multi-temporal images regardless of their viewing angles. Therefore, VHR satellite images can be used for change detection.

Certain embodiments of the present disclosure relate to a computer-implemented method. The method includes patch-wise coregistration (PWCR) for change detection using satellite or airborne images acquired under different viewangles.

Certain embodiments of the present disclosure relate to a computer-implemented method for coregistering remote sensing images acquired by satellites, aircraft, UAV and other sensor platforms from different viewing angles. The images can be off-nadir images or other sorts of remote sensing images. A patch-wise coregistration (PWCR) is used to coregister corresponding image patches at a local level. A patch can vary from a pixel to a large image segment that represents a part of or the whole ground object. In addition, the method includes finding corresponding patches in the two images and can include conducting change detection by comparing the corresponding patches for at least one difference such a difference in the spectral properties within the corresponding patches.

Certain embodiments of the present disclosure relate to a system including one or more hardware processors and a memory. The memory stores instructions. When the instructions are executed by the one or more hardware processors, the one or more hardware processors perform a method. The method includes coregistering remote sensing images acquired by a satellite or airborne sensor from different viewing angles. The images can be off-nadir images or other sorts of remote sensing images. The programmed method includes a patch-wise coregistration (PWCR) method to coregister corresponding image patches at a local level. A patch can vary from a pixel to a large image segment that represents a part of or the whole ground object. In addition, the programmed method includes finding corresponding patches in the two images and can further include conducting change detection by comparing the corresponding patches for at least one difference such a difference in the spectral properties within the corresponding patches.

Certain embodiments of the present disclosure relate to a non-transitory, computer-readable medium that stores instructions. When the instructions are executed by a processor, the processor performs a method. The method includes coregistering remote sensing images acquired by a satellite or airborne sensor from different viewing angles. The images can be off-nadir images or other sorts of remote sensing images. The programmed method includes a patch-wise coregistration (PWCR) method to coregister corresponding image patches at a local level. A patch can vary from a pixel to a large image segment that represents a part of or the whole ground object. In addition, the programmed method includes finding corresponding patches in the two images and can further include conducting change detection by comparing the corresponding patches for at least one difference such a difference in the spectral properties within the corresponding patches.

Referring initially to FIG. 1, a PWCR component is depicted. PWCR is directed to finding the border of a segment in one image based on its border in another bi-temporal or multi-temporal image. To account for the relief distortion differences caused by the viewing angle difference of the bi-temporal images, the RPCs of the two images and a DSM are used in the coregistration process. The DSM needs to be acquired at the same or similar time as one of the images. The image acquired at the same time as the DSM is used as a base image; the other image is used as a target image.

To find corresponding patches in the bi-temporal images, patches in the base image are generated by segmentation. The DSM pixels are then back-projected into the two bi-temporal images using the Rational Function Models (RFMs) of the two images (RFM1 and RFM2 in FIG. 1). The back-projection is used to guide the identification of the corresponding pixels in the bi-temporal image. Knowing the corresponding pixels, the corresponding patches can be generated in the target image based on the previously generated patches in the base image.

After the base patches are transferred from the base image to the target image, i.e. the corresponding patches are generated in the target images, object-based change detection is conducted by comparing the spectral properties of the corresponding patches (see Change Analysis component of FIG. 1). If the spectral properties of the corresponding patches are similar, no change is expected; otherwise, a change is expected in the corresponding patches. To measure and compare the spectral properties, the Image Differencing and MAD Transform methods for providing change criteria were tested and adopted.

Due to viewing angles differences, certain occlusions and exposure of building façades might appear in one image but not in the other one. Therefore, to avoid false alarms in the change detection, PWCR can be used for detecting horizontal surfaces of objects, such as building roofs, while ignoring vertical surfaces, such as building façades. In addition, occluded objects can also ignored in the change detection.

The changes of interest may be any sort of alterations in the status of urban objects that cause variations in the spectral values registered by imaging sensors such as a new building/road construction or renovation of a building roof.

Referring again to FIG. 1, an overview of a method for change detection according to the present disclosure is depicted which is composed of three major components: (1) preprocessing, (2) patch-wise coregistration (PWCR), and (3) change analysis.

In the preprocessing component, after pan-sharpening of the images, the base image is segmented to generate patches. In the PWCR component, using the DSM and RFMs, the corresponding patches are generated in the target image. In the change analysis component, after radiometric normalization, by comparison of the spectral properties of the corresponding patches, changes are detected.

Preprocessing

The preprocessing component includes image fusion and segmentation. Fusion of multi-spectral images with the pan image of the same temporal dataset is performed in order to produce multi-spectral datasets with higher spatial resolutions. FuzeGo software, formally UNB-pansharp, may be used for this purpose (Zhang, 2004). The next step in preprocessing is image segmentation.

As shown in FIG. 1, the base image is segmented. There are different known methods for image segmentation such as multi-resolution segmentation and fuzzy c-means (Dey et al. 2010). However, selection of a method which produces segment borders precisely fitting object borders is a challenging task (Tong, Maxwell, Zhang, & Dey, 2012). The more precise object borders generated in the segmentation step, the better change detection results can be expected.

Preferably, in order to avoid false change detection results due to the occlusion and the relief displacement effects, each segment must contain either horizontal (e.g. building roof) or vertical (building façade) parts of an object. For example, a segment can contain a part of a building roof or a part of building façade, but not both of them. These sorts of segments are referred to as patches in the present disclosure.

To achieve this level of segmentation, the base images are over-segmented using the multi-resolution segmentation method. Then, a fuzzy-based segmentation parameter optimization tool (FbSP tool) developed by (Tong et al., 2012) is employed. This tool provides optimized scale, shape, and compactness parameters to merge the segments generated in the first place and produce optimized segmentation results.

In the output of the segmentation step, each pixel in the base image will have a code specifying its unique patch ID denoted by $S_k$, $1<k<K$, where K is the total number of patches in the image.

Patch-Wise Coregistration

According to one embodiment of the present disclosure, in the present coregistration method, the position of the corresponding points in two images is found and then from the corresponding points the corresponding patches are generated. This process is done in three steps which are described below.

Step 1: Image-Ground Coordinate Look-Up-Table Generation

To find the corresponding image points every DSM pixel is back-projected to both image spaces using the associated RPCs. The footprints of projection of each DSM pixel in the images reveal the position of the corresponding points in the image spaces provided that RPCs are error free.

This step is based on the inverse of the space intersection problem in photogrammetry. In space intersection, first, the same area is imaged from multiple view angles. Later on, the image coordinates of the matching image points along with the exterior orientation parameters (related to sensor position and attitude) of each image are used to calculate the object coordinates of the ground points (see FIG. 2(a)). In the image intersection problem, the image coordinates of the matching image points $(x_1,y_1)$, $(x_2,y_2)$ along with the exterior orientation parameters are known and the ground coordinates (X,Y,Z) are unknown.

However, in the present coregistration method it is assumed that the ground coordinates (X,Y,Z), given by DSM, along with the exterior orientation parameters, given by RPCs in satellite images, are known and the coordinates of the matching image points $((x_1,y_1), (x_2,y_2))$ are unknown.

Nevertheless, because of time difference between the images, it is not certain if the matching points/objects still exist. Thus, using the reverse space intersection, which is the back-projection of the DSM into image spaces, the hypothetical matching points, here referred to as corresponding points, are detected (FIG. 2(b)). For this projection Rational Function Model (Equations 1) is used (Grodecki, 2001).

$$\tilde{x} = \frac{P_1(X, Y, Z)}{P_2(X, Y, Z)} \quad (1)$$

$$\tilde{y} = \frac{P_3(X, Y, Z)}{P_4(X, Y, Z)}$$

$$P(X, Y, Z) = \sum_{c=0}^{m}\sum_{b=0}^{m}\sum_{a=0}^{m} A_{a,b,c} X^a Y^b Z^c$$

where $\tilde{x}$ and $\tilde{y}$ are normalized image coordinates, and X, Y, and Z are normalized ground coordinates. m is generally set to 3. In this example, since bi-temporal images are used, the above equations are re-written for the image i (i=1 or 2) and ground point j as $$\begin{bmatrix} \tilde{x} \\ \tilde{y} \end{bmatrix}_{ij} = G_i \left( \begin{bmatrix} X \\ Y \\ Z \end{bmatrix}_j \right) \quad (2)$$

where $$G_i \left( \begin{bmatrix} X \\ Y \\ Z \end{bmatrix}_j \right)$$

is the transformation based on the RFM equations.

However, RPCs provided by imaging vendors have inherent uncertainties due to small attitude or ephemeris errors, which manifest themselves as biases in the image coordinate space (Fraser & Hanley, 2005). Fraser (2003) demonstrated that the bias vectors, which are the result of a direct comparison between the back-projected GCPs in the image space, using RPCs, and the corresponding image points, are fairly invariant within an image and can be modeled using an affine transformation, disregarding the type of terrain. In their experiments, the standard error of the biases is around half a pixel.

Applying the affine bias compensation to the image points, the adjusted RFM equation can be written as $$\begin{bmatrix} \hat{x} \\ \hat{y} \end{bmatrix}_{ij} = T_i G_i \left( \begin{bmatrix} X \\ Y \\ Z \end{bmatrix}_j \right) \quad (3)$$

where $\hat{x}$ and $\hat{y}$ are bias compensated image coordinates and $T_i$ is a 2D affine transformation given in $$\begin{bmatrix} \hat{x} \\ \hat{y} \end{bmatrix}_{ij} = T_i \begin{bmatrix} \tilde{x} \\ \tilde{y} \end{bmatrix}_{ij} = \begin{bmatrix} m_{11} & m_{12} & m_{13} \\ m_{21} & m_{22} & m_{23} \\ 0 & 0 & 1 \end{bmatrix}_i \begin{bmatrix} \tilde{x} \\ \tilde{y} \\ 1 \end{bmatrix}_{ij} \quad (4)$$

where $m_{kl}$, $k \in 1:3$, $l \in 1:2$, are the unknown coefficients of the affine transformation for which at least 3 control points are required. Therefore, using the adjusted RFM equations, a back-projection from ground space to image space can be generated with an accuracy better than one pixel. FIG. 3 depicts how uncorrected RPCs and an affine transformation in each image are used to relate the corresponding image points.

The process of finding the corresponding image points is done indirectly using the DSM as an indicator. By finding the corresponding points, a look-up-table (LUT) is generated. In each row of the LUT, the DSM pixel ground coordinates and the corresponding image points are given. Therefore, for each DSM pixel: $[x_1,y_1,x_2,y_2,X,Y,Z,S_k]_j$, $j \in \{1, 2, \ldots N\}$, is generated; where $(x_1,y_1)$ are base image coordinates, $(x_2,y_2)$ are target image coordinates, $(X,Y,Z)$ are ground coordinates from the DSM that could be also represented by (E, N, H) where E is easting, N is northing, and H is the elevation of ground pixels. $S_k$ is the patch ID from the base image segmentation, and N is the total number of pixels in the DSM.

Step 2: Occlusion and Façade Removal

In the second step, false change detection results caused by the effect of relief displacement and accordingly occlusion must be prevented. This effect is schematically depicted in FIG. 4. In this figure, AE is the hypothetical curve mapping the point A in the object space to the point E in the base image space (AE is represented by a curve since in satellite imagery the collinearity equations are replaced by RFM; therefore, AE is not a straight line). Although all of the points A, B, C, and D are on the mentioned curve, the intensity registered by the sensor in E is related to D, which means that the points A, B, and C are occluded in the base image (Similar effect is known as Z-buffering in computer graphics (Greene, 1993)). After projecting the DSM pixels to the image space, it has to be specified that the intensity of E is originating from D. To solve this issue, we used the associated elevations as follows.

Here, DSM is considered as a 2D matrix in which every entry represents the orthogonal projection of a point on the ground. Thus, the point B does not exist in the DSM and is not projected to the image spaces. Accordingly, point B, and other vertical features, do not generate any rows in the LUT and are automatically removed from the change detection process.

However, the points A, C, and D, are all projected to E and the intensity of E originates from the point with the highest elevation, since in satellite images, the higher elevated points tend to occlude the lower elevated ones. Thus, since E has multiple projections, we can compare the elevations of the projected points (A, C, and D) and match E to the DSM pixel which has the highest elevation (point D). Therefore, with an elevation comparison, the occluded pixels are detected and removed from the LUT. This means even if the points A, B, and C are visible in the target image (points a, b, and c in FIG. 4), they are removed from the change detection process since they are occluded in the base image or belong to a vertical surface.

This process is applied on the LUT generated in Step 1. If any image pixel gets multiple projections, the related elevations of the DSM pixels are compared to remove the rows associated with the occluded pixels from the process.

Step 3: Generation of Corresponding Patches

After generating the LUT and purifying it from the occluded areas, the patches corresponding to those in the base image are generated in the target image. To do so, from the LUT, $[x_1,y_1,x_2,y_2,X,Y,Z,S_k]_j$, the part $[x_2,y_2,S_k]_j$ is selected. Therefore, there exists a unique patch ID (inherited from the base image segmentation) for the not occluded target image pixels. Regardless of occlusion, transformation of the patch ID from the base image to the target image can also be rewritten as $$S_{k_1} = \left\{ \begin{bmatrix} x \\ y \end{bmatrix}_1 \middle| \begin{bmatrix} x \\ y \end{bmatrix}_1 \in S_k \right\} \quad (5)$$

$$S_{k_2} = \left\{ T_2 G_2 \left( \begin{bmatrix} X \\ Y \\ Z \end{bmatrix}_j \right) \middle| T_1 G_1 \left( \begin{bmatrix} X \\ Y \\ Z \end{bmatrix}_j \right) \in S_{k_1} \right\} \quad (6)$$

Hence, the corresponding patches are regenerated in the target image (a vector polygon layer is generated) based on the patch IDs ($S_k$). Since the patch IDs are common between the target and the base image, the corresponding patches in the bi-temporal images are related. Referring again to FIG. 1, this is also referred to in the present application as transferring the patches from the base image to the target image.

Change Analysis

Images with multi-view-angle images can be coregistered using PWCR and then used for change detection. by using corresponding patches in the bi-temporal images. Therefore, we examined the so produced coregistered patches in change detection. Two change detection criteria were tested: Image Differencing and MAD Transform. Image differencing is a simple method and MAD transform is a more advanced method for change detection. In this section, more details are provided regarding the used change detection criteria.

Image Differencing

The subtraction between coregistered multispectral images provides a simple way to detect changes. With this criterion, small intensity differences indicate no change, while large positive or negative values indicate changes. Decision thresholds specify the significance of change which are usually expressed in terms of standard deviation from the mean difference value (RW.ERROR—Unable to find reference:211).

According to an example of the present invention, the mean value of the corresponding patches in the Image Differencing algorithm was used to detect the changed patches.

MAD Transform

MAD Transform, which can be considered as an extended version of PCA, is used as another change identifier in the present example. In PCA change detection, the primary component contains consistent information between the bi-temporal datasets, whereas the secondary component captures the difference (Chen & Hutchinson, 2007). However, as (Nielsen, Conradsen, & Simpson, 1998) state, PCA is dependent on scale, number of channels, and forces the same gain setting of intensity measurements (in the sensors), while MAD is designed to compensate for the shortages of PCA. A MAD Transform is linear scale invariant; which means it is insensitive to linear radiometric and atmospheric effects (Nielsen et al., 1998). Because of the linear model of the MAD Transform, it can be inferred that this method is also capable of compensating for the slight individual bandwidth dissimilarities—if they are linear—in different sensors.

MAD Transform is based on measuring the difference of a linear transformation of two multi-spectral vectors from bi-temporal images, X and Y, in such a way that the variance of the intensities is maximized (Canty, 2014).

$$D = a^T X - b^T Y \quad (7)$$

in which, a and b are coefficients calculated based on Canonical Correlation Analysis. As a result, the multi-spectral bands are transformed into a new space (D) in which the changes are highlighted.

Study Area

The proposed framework is implemented on four bi-temporal satellite image datasets, from the city of Hobart, Tasmania, Australia and Fredericton, New Brunswick, Canada, each covering at least one square kilometer in area. The coverage areas contain typical urban structures with combinations of small to large and low to moderately high elevated buildings. Snapshots of the study areas are presented in FIG. 6.

Table 1 reports the specifications of the satellite images used in this study. The bi-temporal combinations of the images and DSMs for change detection are presented in Table 2.

TABLE 1

Metadata of satellite images used in this study

| Data | IK62 | IK74 | IK75 | Geo000 | Geo001 | WV2 | WV2 |
|---|---|---|---|---|---|---|---|
| Satellite name | IKONOS | IKONOS | IKONOS | GeoEye1 | GeoEye1 | Wordview2 | Wordview2 |
| City name | Hobart | Hobart | Hobart | Hobart | Hobart | Fredericton | Fredericton |
| Country | Australia | Australia | Australia | Australia | Australia | Canada | Canada |
| Date | Feb. 22, 2003 | Feb. 22, 2003 | Feb. 22, 2003 | Feb. 5, 2009 | Feb. 5, 2009 | Jul. 20, 2011 | Aug. 18, 2013 |
| Sat. Az (deg) | 293.74 | 329.42 | 235.74 | 193.69 | 53.48 | 169.9 | 226.6 |
| Sat. Elev. (deg) | 75.17 | 69.14 | 69.20 | 70.06 | 63.87 | 72.9 | 59.1 |
| Solar Az. (deg) | 47.1 | 47.21 | 46.9 | 59.58 | 59.58 | 154.8 | 167.9 |
| Solar Zenith (deg) | 41.2 | 41.23 | 41.1 | 40.62 | 40.62 | 23 | 33.4 |
| Approx. GSD (m) | 0.9 | 0.9 | 0.9 | 0.5 | 0.5 | 0.5 | 0.58 |

TABLE 2

Bi-temporal combinations of satellite images used in this study

| Dataset ID | Target Image | Base Image | Source of DSM | DSM Accuracy |
|---|---|---|---|---|
| DT1 | IK62 | Geo000 | Geo000-Geo001 stereo imagery | 0.5 m |
| DT2 | IK75 | Geo000 | Geo000-Geo001 stereo imagery | 0.5 m |
| DT3 | IK74 | Geo001 | Geo000-Geo001 stereo imagery | 0.5 m |
| DT4 | WV2-2013 | WV2-2011 | LiDAR data | 0.5 m |

The datasets are selected from images with different viewing angles (both azimuth and off-nadir angles are different) which result in existence of high amount of relief displacements towards different directions causing difficulties for conventional coregistration methods. Also the images of datasets DT1 to DT3 are selected from across-sensor imagery while in DT4 the images are selected from the same satellite.

On the other hand, the sources for the used DSMs are from either stereo images or LiDAR as mentioned in Table 2. The accuracy of the both of DSMs are checked with the available ground control points and both DSMs have an accuracy around 0.5 m in all directions.

Table 3 shows the spectral band width and the dynamic range of the satellites whose images are used as across-sensor datasets (DT1 to DT3).

TABLE 3

Spectral band width and the dynamic range of the satellites whose images are used as across-sensor datasets in this study

| Satellite | NIR (μm) | Red (μm) | Green (μm) | Blue (μm) | Dynamic Range |
|---|---|---|---|---|---|
| IKONOS | 0.757-0.853 | 0.632-0.698 | 0.506-0.595 | 0.445-0.516 | 11 bits |
| GEOEYE | 0.78-0.92 | 0.655-0.69 | 0.51-0.58 | 0.45-0.51 | 11 bits |

As can be seen, the dynamic ranges for both satellites are equal to 11 and the spectral bands are also very close. However, slight spectral differences still exist in the across-sensor bi-temporal combinations, which could affect the change detection results.

Radiometric Normalization

Before performing any change analysis, it is necessary to establish a radiometric normalization between bi-temporal images to attenuate the radiometric differences caused by effects like atmospheric conditions and sensor gains. Since the images used in this study are already corrected for atmospheric effects and the solar illumination angles of the bi-temporal sets are similar (Table 1), a linear relation between the intensities of corresponding patches seems reasonable for radiometric normalization.

Typically, radiometric normalization is performed using the pseudo-invariant pixels/objects taken as reference (Sohl, 1999; Im and Jensen, 2005) in a supervised manner. For unsupervised radiometric normalization, Ye and Chen (2015) proposed a twofold process. In this study, an object-based version of their process is used. Here, after the PWCR, a linear regression is initially fitted to the mean and standard deviation values of the corresponding patches. Then, the linear coefficients are used to normalize the target object mean values. After that, it is necessary to remove the effect of changed patches from the radiometric normalization regression results, since only the radiometric values of the corresponding unchanged patches should be used for radiometric normalization. For this purpose, using a simple change detection method, the Image Differencing method, the unchanged patches are detected and removed from the radiometric normalization process. Next, a new linear regression is fitted to the mean and standard deviation values of the unchanged corresponding patches in the base and target images. Finally, all the target mean values are normalized using the latter generated linear regression coefficients. FIG. 7 shows an example of scatter plots of the mean values of the base and target patches in dataset DT3 (for band Red). FIG. 7(a) depicts the initial mean values and the first regression line. After removing the changed patches from the radiometric normalization process, the scatter plot and the final regression line are presented in FIG. 7(b). As can be seen, the scatter of the unchanged patches approximately follows a linear function. Therefore, a linear regression is suitable for the radiometric normalization step in the present example.

The reason both mean and standard deviation were used in linear regression is that the values of the pixels in each patch were estimated by their mean value. However, to have a better estimate of the linear regression parameters the deviation of the pixels from mean value in each patch can also be used in this regard. In linear algebra, any linear transformation of the data will result in the exact same linear transformation of the mean and the standard deviation values of the data. Therefore, both mean and standard deviation values can be used for linear parameters regression.

Results

PWCR Results

FIG. 8 depicts examples of the original patches in the base images, (a), (c), and (e), and the corresponding ones generated in the target images, (b), (d), and (f), using the presented PWCR method. As can be seen, the borders of the so generated patches in the target images properly fit the real object borders. FIG. 8(b) is a part of the target and the older image in the bi-temporal set DT3. The borders of the buildings, and also other newly constructed objects which exist in the base image (FIG. 8(a)), are also transferred to the old image where there is no construction yet. This produced empty polygons on the ground in FIG. 8(b). FIG. 8(c) shows the patches of a part of the base image in dataset DT1. The corresponding patches in the target image are shown in FIG. 8(d). FIG. 8(e) shows the roof borders of some high-elevated buildings in the base image of dataset DT4. The corresponding roofs generated using the PWCR in the target image are also shown in FIG. 8(f).

FIG. 9 depicts an example comparing the results of the segments transferred from the base image to the target image, using the conventional polynomial image-to-image registration and the PWCR method. FIG. 9(a) presents the manually generated segments (object borders) of the base image in dataset DT3; in FIG. 9(b) the same segments are generated in the target image using the PWCR method; in FIGS. 9(c), (d), and (e) the target image (from dataset DT3) is registered to the base one using first, second, and third order polynomials, respectively, in such a way that the coregistration RMSE is less than one pixel. Then, the segmentation result of the base image is used as a thematic layer for segmentation of the coregistered target image. As can be seen in FIG. 9, even with high order polynomials, segments do not fit the actual building borders properly.

In order to quantify the performance of the PWCR method for image coregistration, it must be proved that the segments generated in the target image are consistent with the actual borders of the objects present. Thus, for the purpose of accuracy assessment, in each dataset, a group of test patches is considered among unchanged objects, generally from the building class (building roofs) since they have distinct borders. The borders of the test objects are manually generated in the target images (building roof polygons). Later on, the overlap of patches generated in the target images using the PWCR method are checked against the actual border of the objects generated as polygons manually in the target image. If they are consistent a high overlap is expected. Therefore, the intersection of the polygons gives a proper criterion to test the accuracy. However, in order to check the shifts between the objects, the union of the objects also matters. Here, an Area Ratio given in Equation 8 is suggested to be an accuracy criterion.

$$\text{Area Ratio} = \frac{A \cap B}{A \cup B}. \tag{8}$$

where $\cup$ represents the union of two polygons and $\cap$ represents the intersection of two polygons. If the polygons are identical (which is the ideal case) the Area Ratio is 1. The closer the ratio to 1, the better the accuracy of the coregistration.

Here, the Area Ratio generated using the PWCR method was compared with the Area Ratio generated using a conventional coregistration method. In the tested conventional method, first the base image and the target image are converted to orthophotos. Then, the two orthophotos are coregistered using a second degree polynomial coregistration with an RMSE of less than 1 pixel. After that, the manual test object borders are generated in the base orthophoto and the resulting polygon layer is used as a thematic layer to segment the target image. Finally, the Area Ratio for the thematic segments and the actual building borders in the target image are calculated. FIG. 10 depicts examples of the reference segments generated for this comparison.

FIG. 12 presents the comparison of the Area Ratios generated using the PWCR method and the conventional method for over 25 different test objects (mainly buildings with similar areas) in each dataset. For each specific test object, two Area Ratio numbers are presented by a black bullet for the PWCR result and a white bullet for the conventional method result. As can be seen, PWCR has higher Area Ratios compared to the conventional method which means PWCR generates more accurate object borders.

Change Detection Results

The multi-spectral mean values of the corresponding patches in bi-temporal images are used to calculate two change criteria: Image Differencing and MAD Transform. The final product of each criterion for change detection is a sort of binary classification: changed or unchanged. However, since the exercise was to prove if the comparison of the spectral properties of the corresponding patches are suitable for change detection, the ROC (Receiver Operating Characteristic) curves of the two different change criteria for the four study datasets were generated.

To evaluate the effectiveness of each criterion in change detection, we compare the change results to a reference data (Congalton and Green, 2009), which are generated through manual inspection. In each dataset, a group of around 100 unchanged and changed reference patches are selected and their change status are checked against the results generated using each of the two change criteria. FIG. 13 shows samples of reference patches.

The mentioned process of checking the labels of the reference patches is repeated for a fine range of thresholds associated with each change criterion. For every threshold the values: true positive (tp), true negative (tn), false positive (fp), and false negative (fn) are counted. True positive and true negative are related to the patches which are truly identified as changed and unchanged, respectively; false positive and false negative are related to the patches which are falsely identified as changed and unchanged, respectively.

Using the mentioned values, a ROC curve, which is a plot of True Positive Rate (TPR) versus False Positive Rate (TPR) (Equation 9 and 10), for each criterion across different thresholds is generated (Fawcett, 2006).

$$TPR = \frac{tp}{tp + fn} \tag{9}$$

$$FPR = \frac{fp}{fp + tn} \tag{10}$$

Figure 14:
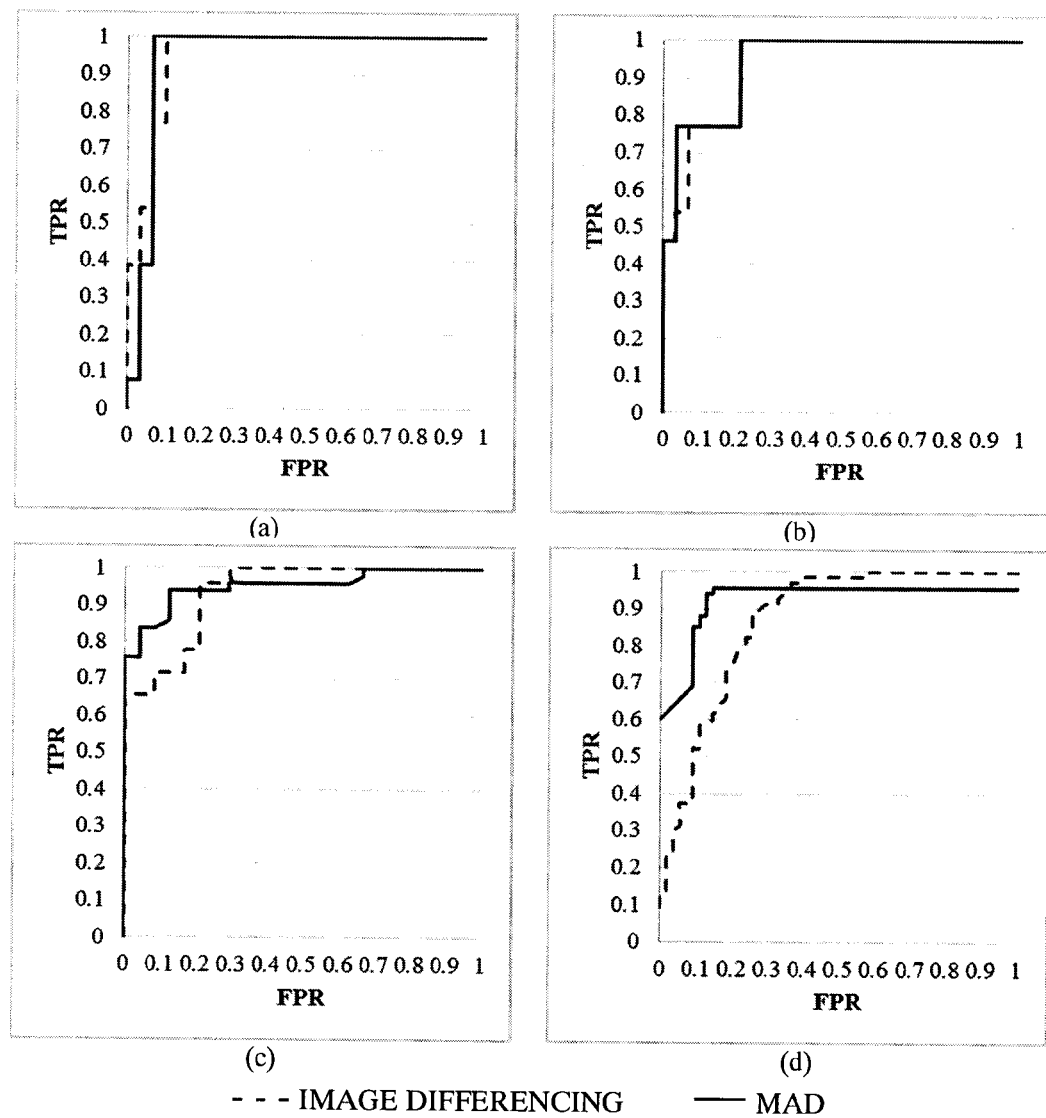
FIGS. 14(a)-(d) show change detection performance of the two change criteria tested in this study: Image Differencing and MAD Transform, presented in ROC curves, for datasets.

FIG. 14 presents the ROC curves generated using the two mentioned change criterion for each of the four datasets.

The closer the ROC curve of a criterion to the point (0, 1) the better the criterion in identifying changed patches from unchanged ones. If the ROC curve of a criterion is close to diagonal (line identified by TPR=FPR), that parameter is not suitable for identification of changed from unchanged patches. To quantify the comparison of the ROC curves, a parameter called Area Under the Curve (AUC) is used (Fawcett, 2006).

Figure 15:
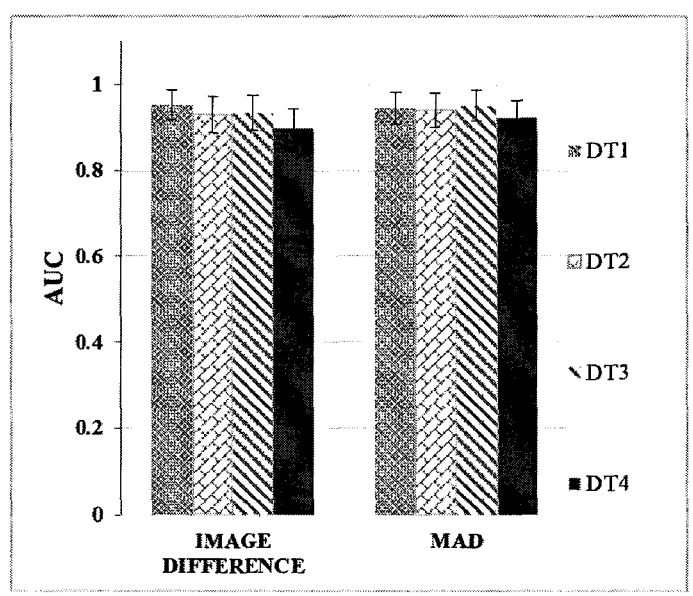
FIG. 15 is a graph of Area Under the Curve of the two change detection criteria tested in this study: Image Differencing and MAD Transform for datasets DT1 to DT4. The vertical black lines represent the 95% confidence intervals of the values.

FIG. 15 shows the bar charts of the AUCs of the change criteria used in this study, for the datasets DT1 to DT4. Since the AUC generated for these datasets are based on a number of check samples and not the whole dataset, the 95% confidence intervals are calculated and shown by a vertical black line on the bar charts of the FIG. 15.

As can be seen in FIG. 15, the Image Differencing method and MAD Transform both have high AUC values which show high accuracy in discriminating changed segments from unchanged ones.

As can be seen from FIG. 8, regardless of different relief displacement directions of the buildings in the images or the structure of urban area, the PWCR has been able to generate properly fitting roof borders in the target images. The different off-nadir angles of the images in the bi-temporal datasets did not affect the PWCR accuracy.

As presented in FIG. 12, the Area Ratios generated by the PWCR method (black bullets) are more consistent and closer to one than the Area Ratios generated by the conventional method (white bullets). The PWCR Area Ratios, mainly range from 0.8 to 0.95. This shows PWCR produces corresponding segments that closely fit the actual object borders in target images. Conversely, the Area Ratios of the conventional method are lower than the results of PWCR, by roughly 40%, and also are highly variable (ranging from 0.05 to 0.9). This is because the PWCR method accounts for the relief displacement caused by high off-nadir angles by using the orientation parameters (RPCs) of the images. However, this issue is not solved in the conventional method; in fact, the higher the elevation of the buildings, the higher the relief displacement. This leads to high divergence between the object borders generated using the conventional co-registration and the actual object borders in the target image which results in lower Area Ratio values. The variance of the conventional method Area Ratios is due to elevation differences of the test objects.

Still, since the Area Ratios in the PWCR method are not equal to one (ideal case), there exists contamination of the neighbor segments in each target image patch generated by PWCR. This contamination is referred to as sliver polygons in the literature related to GIS-based change detection methods (Blaschke, 2005). A portion of this contamination is due to the uncertainty in the position of the exact edge pixels and the rest is due to errors in DSM, RPCs, and GCPs. To reduce this error, we used the mean value of the pixels in each patch as a representation of the patch for change detection. This can slightly compensate for the mentioned contamination of the neighbor pixels.

Referring to FIG. 10($d$) as an example of misregistration error in the conventional method, the size of the sliver polygons generated by the conventional method is far greater than the size of the sliver polygons generated in PWCR. This is because the borders transferred to the target image using the conventional method do not properly fit the actual object borders due to the unsolved geometric distortion problem. However, since the patches are regenerated in the PWCR method considering the geometric properties of the images, better overlap of the patches and actual borders are attained. Therefore, lower sizes of sliver polygons and higher accuracies in coregistration are achieved by our method.

Furthermore, unlike other 3D-based change detection methods, in this study, only one DSM is required. Nevertheless, the accuracy of DSM highly affects the coregistration accuracy. A DSM with accuracy better than or similar to the spatial resolution of the images can produce accurate coregistration results. A detailed LiDAR-generated DSM could be a reliable source for this purpose (e.g. DT4). A DSM produced by stereo imagery can be also used (e.g. dataset DT1 to DT3) provided that a proper matching technique is used which results in high precision elevation model generation.

Regarding the DSM specifications, since the DSM is projected to the base image to transfer the patch ID to the corresponding place in the target image, it is necessary that the DSM and one of the images, which is considered as the base image, are acquired at the same time, or if they are not synchronized, there must be no change between them. In this study, in datasets DT1 to DT3 the DSM is generated from a stereo image set from which one image is selected for change detection. Therefore, there is no change between the base image and the DSM. However, for dataset DT4, the DSM is generated using LiDAR data which is separate from the bi-temporal imaging sources. In this case, the DSM is checked to ensure no structural differences exist.

On the other hand, in cases that DSM is generated from stereo imagery (DT1 to DT3), since the DSM was generated based on the same RPCs, projecting it back to the associated image space did not require the compensation for bias errors. However, if the source of DSM is different (dataset DT4), bias compensation is required for both bi-temporal images.

Change Detection

Two change criteria were tested, Image Differencing and MAD Transform, on four different urban datasets. The shape of ROC curves of accuracy assessment step (FIG. 14) and the associated AUCs (FIG. 15), which are over 90% across all four datasets, confirm that the change criteria used are suitable for binary change detection. It also confirms that the corresponding patches generated by the PWCR method can be used for change detection even with a simple change detection method like Image Differencing.

By solving the coregistration problem, the PWCR method provides the opportunity to utilize a wide range of imagery for change detection applications even when those images were not useful for change detection using the conventional methods. However, in selecting the bi-temporal image sets we still need to consider the illumination and seasonal effects. Also, if across-sensor images are used, the spectral band widths of the images have to be similar.

The bi-temporal image sets used in these examples have approximately the same spectral properties. Also, by having similar solar angles and close to anniversary acquisition times, the illumination conditions of the bi-temporal sets are similar. Based on Lambert's cosine law (Riaño et al., 2003), regardless of atmospheric effects, as soon as the solar angles of the bi-temporal images are not highly different, the illumination condition in the images should be similar. Therefore, a linear radiometric normalization method was sufficient to attenuate the radiometric differences of the images used in this study since they were already corrected for atmospheric effects.

The present method for coregistration is based on patches (object-based); however, it is not limited to object-based methods. As the method transfers the patches from one image to the other one using their pixel components, one can use change detection using pixel-based work as well, considering that it is not going to be a one-to-one transformation and a post process is required in order to compensate for multiple projections. Also, the change detection accuracy could be higher if the patches are were meaningful object borders by using a pre-generated urban map such as a building border GIS layer.

Finally, since this framework promotes the use of off-nadir images and due to occlusions the study area will be limited to the visible objects, multiple imagery can also be used for a more complete view of the urban objects. Even though we only investigated the use of bi-temporal imagery, the PWCR method is capable of being extended to use multiple imagery as well.

Experiments with four bi-temporal image sets acquired by IKONOS, GeoEye-1 and Worldview-2 satellites demonstrated that the coregistration accuracy of the PWCR method reached at the range from 80% to 95% in terms of overlapped areas (Area Ratios) of corresponding patches; whereas the accuracy of the traditional coregistration method reached the wide range from 5% to 90% depending on the height of the object. The change detection accuracy (AUC) of the PWCR incorporated change detection framework reached over 90% for all of the four datasets.

The success of the PWCR method for coregistration of off-nadir VHR satellite images and the high accuracy of change detection in urban environments open up the potential of using the widely available VHR satellite images for detailed change detections, regardless of the angle difference of the images. This will significantly increase the efficiency and lower the cost of change detection.

The disclosed embodiments have been described with reference to the drawings. However, the scope of this disclosure is not limited to the disclosed embodiments. Without departing from the scope of the present disclosure, the disclosed embodiments may be implemented by making a variety of improvements, corrections, and modifications to the disclosed embodiments on the basis of knowledge that persons skilled in the art have.

The word "example" is used herein to mean "serving as an instance or illustration." Any embodiment described herein as an "example" is not necessarily to be construed as preferred or advantageous over other embodiments Likewise, the term "embodiments" does not require that all embodiments include the discussed feature, advantage or mode of operation.

The terms "comprises," "comprising," "includes" and/or "including", when used herein, specify the presence of stated features, integers, operations, elements, and/or components, but do not preclude the presence or addition of one or more other features, integers, operations, elements, components, and/or groups thereof.

Further, many embodiments are described in terms of sequences of actions to be performed by, for example, elements of a computing device. It will be recognized that various actions described herein can be performed in a varying sequence, and the particular order of the disclosed actions may be rearranged where appropriate without departing from the scope of the claimed subject matter.

REFERENCES

AL-Khudhairy, D., Caravaggi, I. and Glada, S., 2005. Structural damage assessments from IKONOS data using change detection, object-oriented segmentation, and classification techniques. *Photogrammetric Engineering and Remote Sensing*, 71(7): 825-837.

Armenakis C, J Jung, G. Sohn. 2010. Practices and trends in geospatial change determination, *International Archives of the Photogrammetry, Remote Sensing and Spatial Information Sciences*, 38(4), ISPRS Corn IV Symposium, Orlando.

Blaschke, T. 2003, October. Object-based contextual image classification built on image segmentation. *In Advances in Techniques for Analysis of Remotely Sensed Data*, 2003 IEEE Workshop on, 113-119. IEEE CD-ROM.

Blaschke, T., 2005. Towards a framework for change detection based on image objects. *Göttinger Geographische Abhandlungen*, 113: 1-9.

Bouziani M., Goïta K., HE D. C., 2010. Automatic change detection of buildings in urban environment from very high spatial resolution images using existing geodatabase and prior knowledge. *ISPRS Journal of Photogrammetry and Remote Sensing*, 65: 143-153.

Congalton, R., Green, Assessing the accuracy of remotely sensed data: principles and practices. *CRC press*, 2009.

Canty, M. J., 2014. *Image analysis, classification and change detection in remote sensing: with algorithms for ENVI/IDL and Python*. CRC Press.

Chen, G., Hay, G. J., Carvalho, L. M. and Wulder, M. A., 2012. Object-based change detection. *International Journal of Remote Sensing*, 33(14): 4434-4457.

Chen, Z. and Hutchinson, T. C., 2007. Urban damage estimation using statistical processing of satellite images. *Journal of Computing in Civil Engineering*, 21(3): 187-199.

Choi, K., Lee, I. and Kim, S., 2009. A feature based approach to automatic change detection from LiDAR data in urban areas, *ISPRS* 2009.

Crispell, D., Mundy, J. and TAUBIN, G., 2012. A variable-resolution probabilistic three-dimensional model for change detection. *Geoscience and Remote Sensing, IEEE Transactions on*, 50(2): 489-500.

Dey, Vivek, Yun Zhang, and Ming Zhong., 2010. A review on image segmentation techniques with remote sensing perspective. in Proceedings of the International Society for Photogrammetry and Remote Sensing Symposium (ISPRS10), vol. XXXVIII (Part 7A).

Doxani, G., Karantzalos, K. and Strati, M. T., 2012. Monitoring urban changes based on scale-space filtering and object-oriented classification. *International Journal of Applied Earth Observation and Geoinformation*, 15: 38-48.

Fawcett, T. 2006. An introduction to ROC analysis. *Pattern recognition letters*, 27(8), 861-874.

Fraser, C. S. and Hanley, H. B., 2005. Bias-compensated RPCs for sensor orientation of high-resolution satellite imagery. *Photogrammetric Engineering and Remote Sensing*, 71(8): 909-915.

Greene, N., Kass, M., & Miller, G. 1993. Hierarchical Z-buffer visibility. In *Proceedings of the 20th annual conference on Computer graphics and interactive techniques*. 231-238. ACM.

Grodecki, J., 2001. IKONOS stereo feature extraction-RPC approach, *Annual Conference of the ASPRS* 2001 2001: 23-27.

Gueguen, L., Soille, P. and Pesaresi, M., 2011. Change detection based on information measure. *Geoscience and Remote Sensing, IEEE Transactions on*, 49(11): 4503-4515.

Im, J., Jensen, J. and Tullis, J., 2008. Object-based change detection using correlation image analysis and image segmentation. *International Journal of Remote Sensing*, 29(2): 399-423.

Im, J., Rhee, J., Jensen, J. R. and Hodgson, M. E., 2007. An automated binary change detection model using a calibration approach. *Remote Sensing of Environment*, 106 (1): 89-105.

Im, J. and Jensen, J. R., 2005. A change detection model based on neighborhood correlation image analysis and decision tree classification. Remote Sensing of Environment, 99(3): 326-340.

Jung, F., 2004. Detecting building changes from multitemporal aerial stereopairs. *ISPRS Journal of Photogrammetry and Remote Sensing*, 58(3): 187-201.

Kang, Z., Zhang, L., Yue, H. and Lindenbergh, R., 2013. Range Image Techniques for Fast Detection and Quantification of Changes in Repeatedly Scanned Buildings. *Photogrammetric Engineering & Remote Sensing*, 79(8): 695-707.

Liu, Z., Gong, P., Shi, P., Chen, H., Zhu, L. and Sasagawa, T., 2010. Automated building change detection using UltraCam images and existing CAD data. *International Journal of Remote Sensing*, 31(6): 1505-1517.

Nielsen, A. A., Conradsen, K. and Simpson, J. J., 1998. Multivariate alteration detection (MAD) and MAF post-processing in multispectral, bitemporal image data: New approaches to change detection studies. *Remote Sensing of Environment*, 64(1): 1-19.

Niemeyer, I., Marpu, P. R. and Nussbaum, S., 2008. Change detection using object features. *Object-Based Image Analysis*. Springer: 185-201.

Pollard, T. B., Eden, I., Mundy, J. L. and Cooper, D. B., 2010. A volumetric approach to change detection in satellite images. *Photogrammetric Engineering & Remote Sensing*, 76(7): 817-831.

Qin, Rongjun., 2014. Change detection on LOD 2 building models with very high resolution spaceborne stereo imagery. *ISPRS Journal of Photogrammetry and Remote Sensing* 96: 179-192.

Riaño, D., Chuvieco, E., Salas, J., & Aguado, I., 2003. Assessment of different topographic corrections in Landsat-TM data for mapping vegetation types. *Geoscience and Remote Sensing, IEEE Transactions on*, 41(5), 1056-1061.

Sohl, T. L., 1999. Change analysis in the United Arab Emirates: An investigation of techniques, Photogrammetric Engineering &Remote Sensing, 65(4):475-484.

Sundaresan, A., Varshney, P. K. and Arora, M. K., 2007. Robustness of change detection algorithms in the presence of registration errors. *Photogrammetric Engineering & Remote Sensing*, 73(4): 375-383.

Tian, J., Cui, S. and Reinartz, P., 2014. Building change detection based on satellite stereo imagery and digital surface models. *Geoscience and Remote Sensing, IEEE Transactions on*, 52(1): 406-417.

Tong, H., Maxwell, T., Zhang, Y. and Dey, V., 2012. A Supervised and Fuzzy-based Approach to Determine Optimal Multi-resolution Image Segmentation Parameters. *PE&RS*, 78(10): 1029-1044.

Ye, S., and Chen, D., 2015. An Unsupervised Urban Change Detection Procedure by Using Luminance and Saturation for Multispectral Remotely Sensed Images, *Photogrammetric Engineering & Remote Sensing*, 81 (8), 375-383.

Zhang, Y., 2004. Understanding image fusion. *Photogrammetric Engineering and Remote Sensing*, 70(6): 657-661.

Zhou, W., Troy, A. and Grove, M., 2008. Object-based land cover classification and change analysis in the Baltimore metropolitan area using multi-temporal high resolution remote sensing data. *Sensors*, 8(3): 1613-1636.

The invention claimed is:

1. A computer-implemented method comprising:
   providing at least two remote sensing images, wherein one of the images is a base image and one of the images is a target image, and wherein the at least two remote sensing images are bi-temporal or multi-temporal;
   the base image comprising one or more segments;
   providing elevation data for each one or more segments and the sensor parameters of the images;
   wherein each segment comprises an object or a part of an object;
   projecting only non-occluded pixels of the object or part of the object of the each one or more segments from the base image onto the target image and generating corresponding projected segments in the target image; and,
   registering the base image and the target image by registering each one or more segments of the base image with the corresponding projected segments in the target image.

2. The computer-implemented method of claim 1, wherein the elevation data is provided from a digital elevation model or a 3D point cloud.

3. The computer-implemented method of claim 1, further comprising;
   wherein the base image is pre-processed by segmenting the image.

4. The computer-implemented method of claim 1, further comprising comparing at least one of the segments in the base image with their corresponding projected segments in the target image, whereby the existence of at least one difference indicates a temporal change.

5. The computer-implemented method of claim 4, wherein the at least one difference is a spectral difference and/or grey value difference.

6. The computer-implemented method of claim 1, wherein the base and target images are orthophotos, off-nadir images or nadir images.

7. The computer-implemented method of claim 1, wherein each segment in the base image is comprised of pixels within a boundary and wherein the step of projecting each segment comprises projecting the base image pixels within the segment boundary onto the target image space.

8. The computer-implemented method of claim 7, further comprising assigning the same segment ID to all of the pixels of a segment in the base image and wherein all of the pixels of the corresponding segment in the target image have the same ID.

9. The computer-implemented method of claim 1,
   wherein the non-occluded pixels are from the top of the object or part of the object.

10. The computer-implemented method of claim 9, further comprising using the elevation of projected objects to identify objects that are occluded by other objects.

11. A system comprising:
    a computer system configured to:
    receive at least two remote sensing images, wherein one of the images is a base image and one of the images is a target image, the base image comprising one or more segments, and wherein the at least two remote sensing images are bi-temporal or multi-temporal;
    receive elevation data for one or more segments and the sensor parameters of the images;
    wherein each segment comprises an object or a part of an object;
    project only non-occluded pixels of the object or part of the object of the each one or more segments from the base image onto the target image and generating corresponding projected segments; and,
    register the base image and the target image by registering each one or more segments of the base image with the corresponding projected segments in the target image.

12. The system of claim 11, wherein the elevation data is received from a digital elevation model or a 3D point cloud.

13. The system of claim 11, further configured to pre-process the base image by segmenting the image.

14. The system of claim 11, further configured to compare at least one of the segments in the base image with their corresponding projected segments in the target image, whereby the existence of at least one difference indicates a temporal change.

15. The system of claim 14, wherein the at least one difference is a spectral difference and/or grey value difference.

16. The system of claim 11, wherein the base and target images are orthophotos, off-nadir images or nadir images.

17. The system of claim 11, wherein each segment in the base image is comprised of pixels within a boundary and wherein projecting each segment further comprises projecting the base image pixels within the segment boundary onto the target image space.

18. The system of claim 17, further configured to assign the same segment ID to all of the pixels of a segment in the base image and wherein all of the pixels of the corresponding segment in the target image have the same ID.

19. The system of claim 11,
    wherein the non-occluded pixels are from the top of the object or part of the object.

20. The system of claim 19, further configured to use the elevation of projected objects to identify objects that are occluded by other objects.

21. A system comprising:
    a cloud computing environment comprising at least one server, the server being configured to communicate with a device remote from the server to receive instructions to
    receive at least two remote sensing images, wherein one of the images is a base image and one of the images is a target image, the base image comprising one or more segments, and wherein the at least two remote sensing images are bi-temporal or multi-temporal;

receive elevation data for each one or more segments and the sensor parameters of the images;

project only non-occluded parts of each one or more segments from the base image onto the target image using the elevation data and sensor parameters to generate corresponding non-occluded projected segments; and, register the base image and the target image by registering each one or more segments of the base image with the corresponding projected segments in the target image.

22. A non-transitory, computer-readable medium that stores instructions, when the instructions are executed by a processor, the processor performs a method comprising:

providing at least two remote sensing images, wherein one of the images is a base image and one of the images is a target image, and wherein the at least two remote sensing images are bi-temporal or multi-temporal;

the base image comprising one or more segments;

providing elevation data for each one or more segments and the sensor parameters of the images;

projecting non-occluded parts of each one or more segments from the base image onto the target image using the elevation data and sensor parameters to generate corresponding non-occluded projected segments; and, registering the base image and the target image by registering each one or more segments of the base image with the corresponding projected segments in the target image.

23. The method of claim 1, further comprising comparing each one or more segments of the base image with the corresponding projected segments in the target image for identifying a temporal change.

* * * * *